United States Patent [19]

Boetzkes

[11] Patent Number: 4,533,871
[45] Date of Patent: Aug. 6, 1985

[54] RANGE-ENABLE INFORMATION SYSTEM FOR PLURAL MOBILE OBJECTS

[75] Inventor: Peter C. Boetzkes, North Vancouver, Canada

[73] Assignee: DSL Dynamic Sciences Limited, St. Laurent, Canada

[21] Appl. No.: 291,409

[22] Filed: Aug. 10, 1981

[51] Int. Cl.³ .................... G01B 7/14; G01S 13/76
[52] U.S. Cl. ................................ 324/207; 324/334; 340/825.54; 343/6.5 R
[58] Field of Search ......... 343/6.5 LC, 6.5 R, 6.5 SS, 343/6.8 R, 6.8 LC, 6.5; 328/149; 324/334, 207, 227; 455/41, 89; 340/825.54

[56] References Cited

U.S. PATENT DOCUMENTS

| | | | |
|---|---|---|---|
| 2,992,325 | 7/1961 | Lehan | 324/334 X |
| 3,153,232 | 10/1964 | Fletcher et al. | 343/6.5 LC X |
| 3,336,591 | 8/1967 | Michnik et al. | 343/6.5 LC |
| 3,680,121 | 7/1972 | Anderson et al. | 343/457 |
| 3,737,901 | 6/1973 | Scott | 343/6.5 LC X |
| 3,810,179 | 5/1974 | Merrick | 343/6.5 LC |
| 3,828,306 | 8/1974 | Angeloni | 343/457 X |
| 3,953,856 | 4/1976 | Hammack | 343/458 |
| 4,054,881 | 10/1977 | Raab | 324/227 X |
| 4,112,421 | 9/1978 | Freen, Jr. | 343/457 |
| 4,167,007 | 9/1979 | McGeoch et al. | 343/6.5 LC X |
| 4,314,247 | 2/1982 | Oude Elberink et al. | 343/6.5 LC X |
| 4,387,465 | 6/1983 | Becker | 328/149 X |

Primary Examiner—T. H. Tubbesing
Assistant Examiner—Brian Scott Steinberger
Attorney, Agent, or Firm—Christensen, O'Connor, Johnson & Kindness

[57] ABSTRACT

An information system for communicating information from each of a plurality of separate locations to each of a plurality of mobile objects includes a beacon at each location and a beacon triggering and detecting apparatus mounted on each object. Each beacon triggering and detecting apparatus is assigned a predetermined and unique time window within a common system cycle. During the initial portion of its window, the beacon triggering and detecting apparatus transmits a trigger signal at a frequency $f_1$, with the trigger signal as transmitted having a substantially constant amplitude and with frequency $f_1$ being chosen so that the intensity of the trigger signal decays as the cube of radial distance from the object. If the object is within a predetermined beacon trigger range of a location, the beacon at that location detects the trigger signal and transmits a beacon signal at a frequency $f_2$ (substantially greater than frequency $f_1$) during the terminal portion of the window which is detected by the beacon triggering and detecting apparatus. The beacon signal contains any information that is desired to be communicated from the location to the objects, such as the identity or location of the beacon. Provision is made for synchronizing the various beacon triggering and detecting apparatus by signals at a frequency $f_3$ (that is distinct from frequencies $f_1$ and $f_2$) from a base station, for disabling operation of a given beacon triggering and detecting apparatus upon the failure of that apparatus to be synchronized by the base station for a predetermined period of time, and for transferring the information that has been communicated from each location to each object to the base station for further processing and centralized information display.

25 Claims, 9 Drawing Figures

RANGE-ENABLE INFORMATION SYSTEM FOR PLURAL MOBILE OBJECTS

FIELD OF THE INVENTION

This invention generally relates to the field of communication systems, and, more particularly, to such a system for use with a plurality of mobile objects that is operative to communicate information from a specific location to one of the objects only when the object is within a predetermined range of the location.

BACKGROUND OF THE INVENTION

Interrogator/responder systems are known that are adapted for use with a plurality of mobile objects such as vehicles and that function to communicate information from one of a plurality of spaced-apart locations to one of the mobile objects when the mobile object is in proximity to the location. In a typical interrogation/responder system designed for use with a transportation system, each vehicle is provided with an interrogator unit and a responder unit is positioned at each location. When one of the vehicles comes into proximity to one of the locations, an interrogating signal from the interrogator unit causes the responder unit to transmit a response signal to the interrogator unit, which response signal includes selected information such as the identity of the responder unit location. The information within the response signal is stored within the interrogator unit and may be transmitted to a central location along with similar information from the interrogator units of the other vehicles so as to provide a centralized record and display of vehicle location information which can be used to control vehicle movements in the transportation system.

In such a transportation system applications, a larger number of responder units are required and each responder unit must be capable of operating for extended periods of time without requiring servicing. It is therefore important that each responder unit be inexpensive to construct and consume as little power as possible. To meet the requirements of low cost and low power consumption, the responder unit is advantageously powered from the interrogating signal, as disclosed in U.S. Pat. No. 3,989,619, Object Location/Identification System, Carsten et al., issued Aug. 5, 1975 to the assignee of the present invention.

Due to the fact that the responder unit is powered by the interrogating signal, the range of information communication between the responder unit and the interrogator unit is extremely limited, e.g., a few meters. This range limitation on interrogator/responder systems of the type described makes such systems inherently unsuitable for use in applications in which information is to be communicated from a specific location to a plurality of vehicles in proximity to the location. An exemplary application of the latter type would be an open-pit mine control system in which a plurality of trucks are transporting ore from one or more loading locations to one or more discharge locations. At any given point in time, a number of trucks may be waiting at one of the locations and an interrogator/responder system would be capable of providing information as to the identity of that location only to the truck whose interrogator unit was within the limited range of the responder unit at the location. As a consequence, the remaining trucks at the location would not be receiving information as to the identity of the location, so that the centralized record and display at the central location would not truly reflect the actual location of all trucks in the system.

The loss of communications (and thus of vehicle location information) that is caused by the range limitation of interrogator/responder systems could be overcome by the use of a conventional VHF beacon system. In such a system, each location would be equipped with a beacon that transmitted, asynchronously with respect to any other beacon, a periodic VHF signal including information as to the identity of the location. Each vehicle would then be provided with a VHF receiver, and the amplitude characteristics of the VHF signals from the beacons and the design of each receiver would be chosen so that a VHF signal from a given beacon would be detected by a vehicle's receiver only when the vehicle was within a predetermined range of a location. Such a beacon system is subject, however, to the serious disadvantage that the predetermined range of beacon detection cannot be precisely controlled due to the fact that the signal from each beacon is at VHF. In the open pit mine control system application previously discussed, the locations are close enough to each other so that the receiver on a vehicle would in certain circumstances receive and detect VHF signals from two or more beacons even though the vehicle was closer to one of the beacons than to the others. In such circumstances, loss of accurate vehicle location information would result.

It is therefore an object of this invention to provide an improved information system for a plurality of mobile objects.

It is another object of this invention to provide such an information system that is operative to communicate information from a specific location to one of the objects only when the object is within a predetermined range of the location.

It is yet another object of this invention to provide such a system which is capable of communicating information from a location to a plurality of objects within the predetermined range of the location.

It is still another object of this invention to provide such a system which is capable of more precisely controlling the predetermined range of information communication than prior art VHF beacon systems.

It is a further object of this invention to provide such a system in which the predetermined range of information communication is substantially greater than that achieved with prior art interrogator/responder systems.

It is yet a further object of this invention to provide such a system in which the portion of the system at each location has relatively low power consumption.

SUMMARY OF THE INVENTION

The foregoing objects, and other objects and advantages that will be apparent to those of ordinary skill in the art from a consideration of the entire specification, are achieved in an information system for communicating information from each of a plurality of separate locations to each of a plurality of mobile objects. The system comprises a plurality of beacon triggering and detecting apparatus, each of which is associated with and mounted on one of the objects, and a plurality of beacons, each of which is associated with and mounted at one of the locations.

Each beacon triggering and detecting apparatus includes:

first means for transmitting a substantially-omnidirectional trigger signal at a first RF frequency, the trigger signal as transmitted having a substantially constant amplitude and the first RF frequency being chosen so that the amplitude of the trigger signal decays, from this substantially constant amplitude, substantially as the cube of radial distance from the associated object at all points within a predetermined beacon trigger range surrounding the associated object;

second means receiving and detecting a beacon signal and extracting any information therein; and, third means enabling the first means and the second means only during an associated and unique one of a plurality of successive windows occurring in a repetitive system cycle, with each window having substantially the same duration.

Each beacon includes:

fourth means that is continuously enabled and that is operative to receive trigger signals from the plurality of beacon triggering and detecting apparatus and to detect a trigger signal that has been received from any one of the plurality of beacon triggering and detecting apparatus only when the associated object is at a distance from the location of the beacon that is within the beacon trigger range and the amplitude of the received trigger signal equals or exceeds a predetermined threshold value; and, fifth means that is enabled only in response to detection of a trigger signal to transmit a beacon signal within a predetermined period of time following detection that is within the unique window of that one of the plurality of beacon triggering and detecting apparatus providing the trigger signal that has been detected, the beacon signal being at a second RF frequency that is substantially greater than the first RF frequency and the beacon signal including information desired to be communicated from the location of the beacon to the objects.

Preferably, each trigger signal has a substantially constant duration, and the fourth means in each beacon includes: means for repetitively integrating a received trigger signal; and, comparator means for signifying detection of a received trigger signal whenever the integrated amplitude thereof exceeds a predetermined threshold amplitude. The beacon trigger range may then be varied by maintaining the threshold amplitude substantially constant and by providing means for selectively adjusting the amplitude of a received trigger signal.

Preferably, the third means in each beacon triggering and detecting apparatus comprises a first oscillator and a master timer that is clocked by the first oscillator for enabling the first and second means and that is internally reset at periodic intervals equal in duration to that of the system cycle and at times corresponding to the relative time occurrences of the associated window. In order to maintain synchronization between the various beacon triggering and detecting apparatus, the system may also comprise a base station including a second oscillator, means clocked by the second oscillator for developing a synchronizing signal at periodic intervals each equal in duration to that of the system cycle, and means for transmitting the synchronizing signal at a third RF frequency distinct from the first and second RF frequencies. Object logic means are then associated with each beacon triggering and detecting apparatus and are operative to: receive each synchronizing signal; develop a universal synchronizing pulse from each received synchronizing signal; develop a delayed synchronizing pulse from each universal synchronizing pulse, the delayed synchronizing pulse being delayed in time from the universal synchronizing pulse by an amount related to the relative time occurrence of the associated window; provide a reset pulse at a predetermined time following each delayed synchronizing pulse; and, externally reset the master timer at the time of each reset pulse.

If synchronization by the base station is not made within an extended period of time, the window of a give beacon triggering and detecting apparatus may well overlap that of another beacon triggering and detecting apparatus. Accordingly, the third means in each beacon triggering and detecting apparatus further includes a secondary timer that is clocked by the master timer and that is reset by each reset pulse, the secondary timer being operative upon the absence of a predetermined number of successive ones of the reset pulses to disable the master timer until the occurrence of a successive reset pulse.

The information that is communicated from a location to an object is stored in the associated object logic means which also includes means responsive to a polling signal from the base station at a third RF frequency distinct from the first and second RF frequencies for transmitting the stored information to the base station. At the base station, means are provided for providing polling signals to the object logic means and for receiving, processing and displaying the information provided by each object logic means in response to a polling signal.

BRIEF DESCRIPTION OF THE DRAWINGS

The invention can best be understood by reference to the following portion of the specification, taken in conjunction with the accompanying drawings in which.

DESCRIPTION OF A PREFERRED EMBODIMENT

Figure 1:
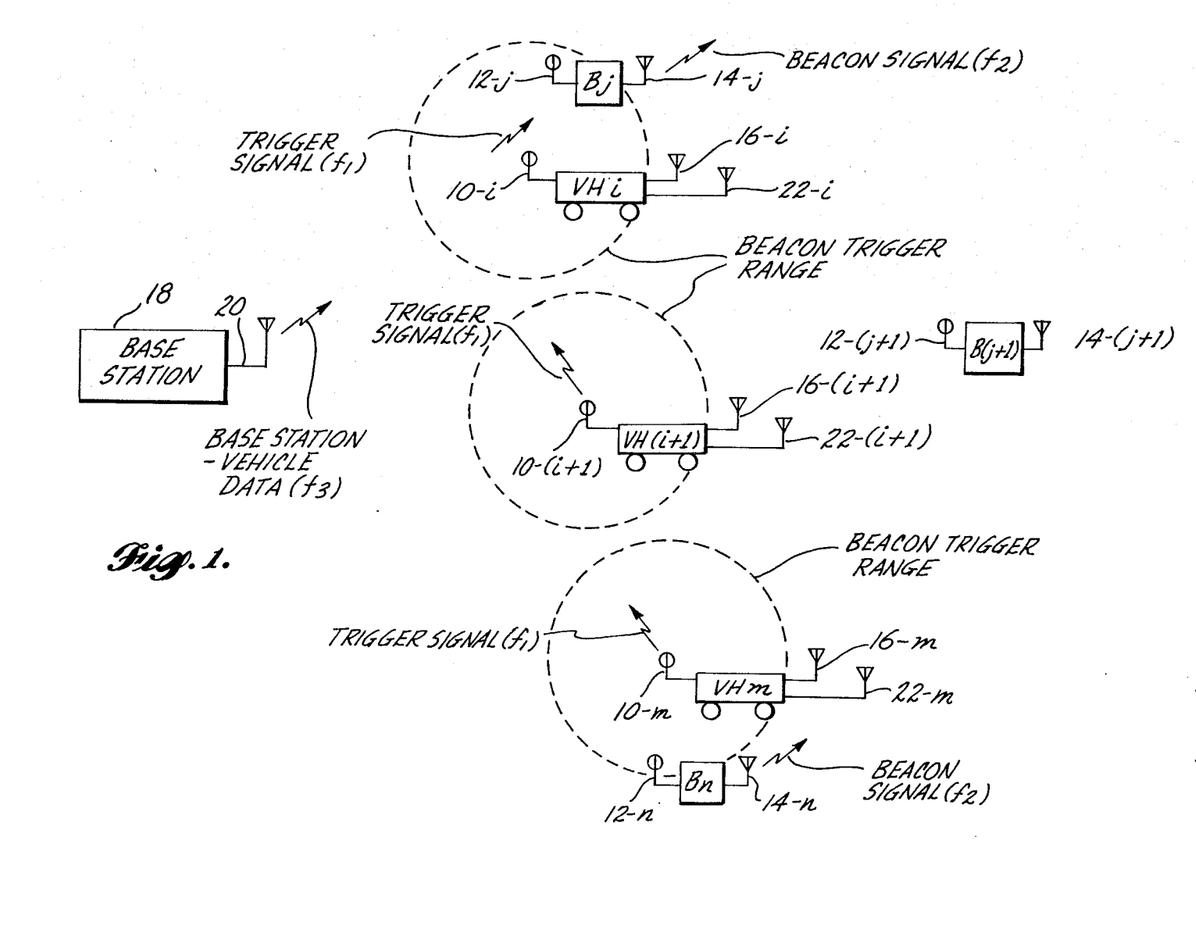
FIG. 1 is a schematic representation of a typical application of the information system that includes a plurality of vehicles, a plurality of beacons at stationary or semistationary locations, and a base station at a central fixed locations.

Referring now to FIG. 1, a plurality of vehicles VHi, VH(i+1)... VHm are movable throughout a certain geographic area, and a plurality of beacons Bj, B(j+1) ... Bn are positioned at those specific and spaced-apart locations within this area at which information is to be communicated to one or more of the vehicles. Vehicles VHi, VH(i+1)... VHm are provided with respective transmit loops 10-i, 10-(i+1)... 10-m, and beacons Bj, B(j+1)... Bn are provided with respective receive loops 12-j, 12-(j+1)... 12-n. Each vehicle has a beacon triggering and detecting apparatus that causes the associated transmit loop of the vehicle to transmit a trigger signal at a frequency $f_1$. Each transmit loop is constructed and arranged so that the trigger signal therefrom is substantially omnidirectional in a plane perpendicular to its loop axis, and frequency $f_1$ is chosen so that the field intensity of the trigger signal decays substantially as the cube of radial distance from the transmit loop. Each receive loop is capable of substantially omnidirectional reception, and each beacon includes a receiver that is operative to detect a trigger signal at its associated receive loop only when the received power of the trigger signal equals or exceeds a predetermined threshold value. Since the field intensity of each trigger signal decays rapidly with radial distance from its associated transmit loop, the threshold value in the receiver in each beacon can be selected to establish a predetermined beacon trigger range surrounding each vehicle within which a trigger signal from a vehicle will be detected by a beacon. As illustrated in FIG. 1, vehicle VHi is within beacon trigger range of beacon Bj, vehicle VHm is within beacon trigger range of beacon Bn, vehicle VH(i+1) is not within beacon trigger range of any beacon, and no vehicle is within beacon trigger range of beacon B(j+1).

Beacons Bj, B(j+1)... Bn include respective transmit antennas 14-j, 14-(j+1)... 14-n, and vehicles VHi, VH(i+1)... VHm include respective receive antennas 16-i, 16-(i+1)... 16-m. In response to a detected trigger signal, a receiver within a beacon causes its associated transmit antenna to transmit a beacon signal at a frequency $f_2$, with the beacon signal including whatever information (such as the identity or location of the beacon) that is desired to be communicated from the beacon to the vehicle or vehicles within range. As illustrated in FIG. 1, beacons Bj and Bn, having been triggered by vehicles VHi and VHm, each transmit beacon signals. The beacon triggering and detecting apparatus within each vehicle is responsive to a beacon signal received by its associated receiving antenna so as to detect the beacon signal and retrieve the information contained therein.

In order to maximize signal-to-noise ratio and the efficiency of the transmit antenna, frequency $f_2$ is substantially higher than that of frequency $f_1$. As a result, the beacon signal from any beacon may be received by the receiving antennas of all of the vehicles and will have an amplitude when received which is capable of detection by the beacon triggering and detecting apparatus of each vehicle. As an example, the beacon signal from beacon Bj could be detected by the beacon triggering and detecting apparatus within each of vehicles VHi, VH(i+1)... VHm. In order that a given beacon signal be detected only by that beacon triggering and detecting apparatus that has triggered the beacon, each beacon triggering and detecting apparatus is assigned a predetermined and unique time window within a common system cycle. The transmission of a trigger signal by a beacon triggering and detecting apparatus occurs during the initial portion of its window, and each beacon is constructed so that the beacon signal therefrom is provided for a predetermined period of time following the detection of a trigger signal. Each beacon triggering and detecting apparatus is enabled to detect a beacon signal throughout its window, and the beacon signal that is provided in response to a trigger signal from a beacon triggering and detecting apparatus generally occurs during the terminal portion of the window for that beacon triggering and detecting apparatus. Referring again to FIG. 1, the beacon signal from beacon Bj will be provided only during the window assigned to the beacon triggering and detecting apparatus associated with vehicle VHi, and will not occur during the windows assigned to the beacon triggering and detecting apparatus associated with vehicles VH(i+1) and VHm. Accordingly, the information related to the location of beacon Bj will be communicated only to vehicle VHi and not to vehicles VH(i+1) and VHm. It should also be noted that if vehicle VH(i+1) were to be within beacon trigger range of beacon Bj, beacon Bj would be triggered to provide successive beacon signals to vehicles VHi and VH(i+1) within the unique windows assigned to those vehicles so that the information related to the location of beacon Bj would be communicated to each of vehicles VHi and VH(i+1).

Each beacon triggering and detecting apparatus includes a master timer (comprising a master counter and a timing logic circuit) which is responsive to a highly-stable oscillator. Each master timer is operative to divide pulses from its associated oscillator so as to develop appropriate control signals defining the relative time occurrence of the unique window assigned to the beacon triggering and detecting apparatus. In order to maintain synchronization between the various beacon triggering and detecting apparatus, a base station 18 includes a highly stale oscillator of a type similar to that in each beacon triggering and detecting apparatus. At desired intervals, base station 18 causes a synchronizing signal at a frequency $f_3$ (that is distinct from frequencies $f_1$ and $f_2$) to be transmitted by a transmitting antenna 20 thereof to receiving antennas 22-i, 22-(i+1)... 22-m respectively associated with vehicles VHi, VH(i+1)... VHm. Each synchronizing signal includes either a sync word that occurs in real-time at the desired time of synchronization or a "marker" and a word indicating the real-time signified by the marker. In response to each synchronizing signal, a vehicle logic unit at each vehicle develops a universal sync pulse that occurs at the desired time of synchronization. The universal sync pulse is delayed within the vehicle logic unit by an amount related to the desired time occurrence of the unique window assigned to the associated beacon triggering and detecting apparatus, and then applied to the master timer in the associated beacon triggering and detecting apparatus so as to precisely adjust the actual time occurrence of the window assigned thereto.

In certain circumstances, radio communications between base station 18 and one of the vehicles may be disrupted. The stability of the oscillator in each beacon triggering and detecting apparatus is chosen so that each beacon triggering and detecting apparatus will continue to operate in substantial synchronism during the system cycle with the removing beacon triggering and detecting apparatus in the absence of synchronization by the base station. However, the oscillator in each beacon triggering and detecting apparatus will have some drift so that the window of a given beacon triggering and detecting apparatus may well overlap that of another beacon triggering and detecting apparatus if synchronization by the base station is not made within an extended period of time. To avoid false beacon triggering and detection that might result from such an overlap, a secondary timer is provided in each beacon triggering and detecting apparatus that is clocked by the master timer therein and that is reset in response to each received synchronizing signal from the base station. If communications are disrupted so that a predetermined number of successive synchronizing signals are not received by a vehicle (which predetermined number corresponds to the extended period beyond which loss of synchronization may result), the secondary timer disables further operation of the beacon triggering and detecting apparatus.

The information that is communicated from a beacon to a vehicle is stored in the vehicle logic unit. As necessary, base station 18 polls each vehicle logic unit (by signals at frequency $f_3$) whereby each vehicle logic unit transfers the information stored therein to the base station (by signals at frequency $f_3$). From the information transferred thereto, base station 18 then develops a centralized display of various information including the location of all vehicles.

Figure 2:
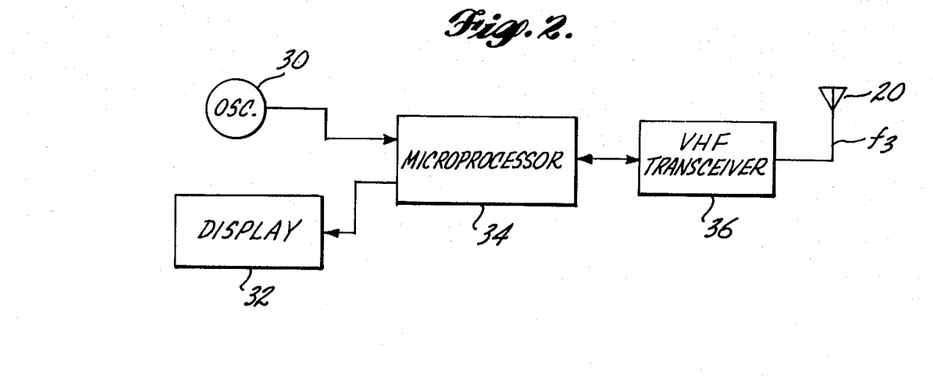
FIG. 2 is an electrical block diagram of that portion of the information system at the base station.

With reference now to FIG. 2, the portion of the system at base station 18 includes an oscillator 30, a display 32, a microprocessor 34, and a VHF transceiver 36 coupled to antenna 20. Oscillator 30 is a highly-stable crystal oscillator of a predetermined type that provides an output signal at a predetermined frequency (e.g. 2.4576 MHz) to microprocessor 34. From the output signal of oscillator 30, microprocessor 34 develops appropriate timing and control signals which cause VHF transceiver 36 to transmit a periodic synchronizing signal at frequency $f_3$ (e.g., 154 MHz) via antenna to each of the vehicles in the system. Preferably, the period of the synchronizing signal is equal to the period of the system cycle and each synchronizing signal includes a sync word modulated in an appropriate manner on frequency $f_3$. Microprocessor 34 is also operative to control VHF transceiver 36 so as to cause a polling signal at frequency $f_3$ to be transmitted to each vehicle, and to process the information received from each vehicle as a result of these polling signals to develop a centralized record of information including vehicle locations which is displayed by display 32.

Figure 3:
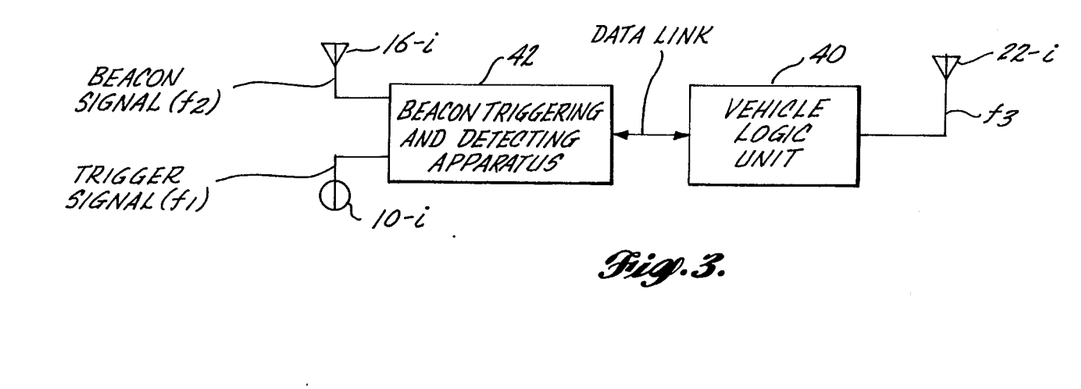
FIG. 3 is an electrical block diagram of that portion of the system at each vehicle, including a vehicle logic unit and a beacon triggering and detecting apparatus.

With reference now to FIG. 3, the portion of the system at each vehicle (such as vehicle VHi) includes a vehicle logic unit 40 coupled to antenna 22-i, a beacon triggering and detecting apparatus 42 coupled to transmit loop 10-i and to antenna 16-i, and a data link (such as as standard RS 232 interface) interconnecting vehicle logic unit 40 and beacon triggering and detecting apparatus 42.

Figure 4:
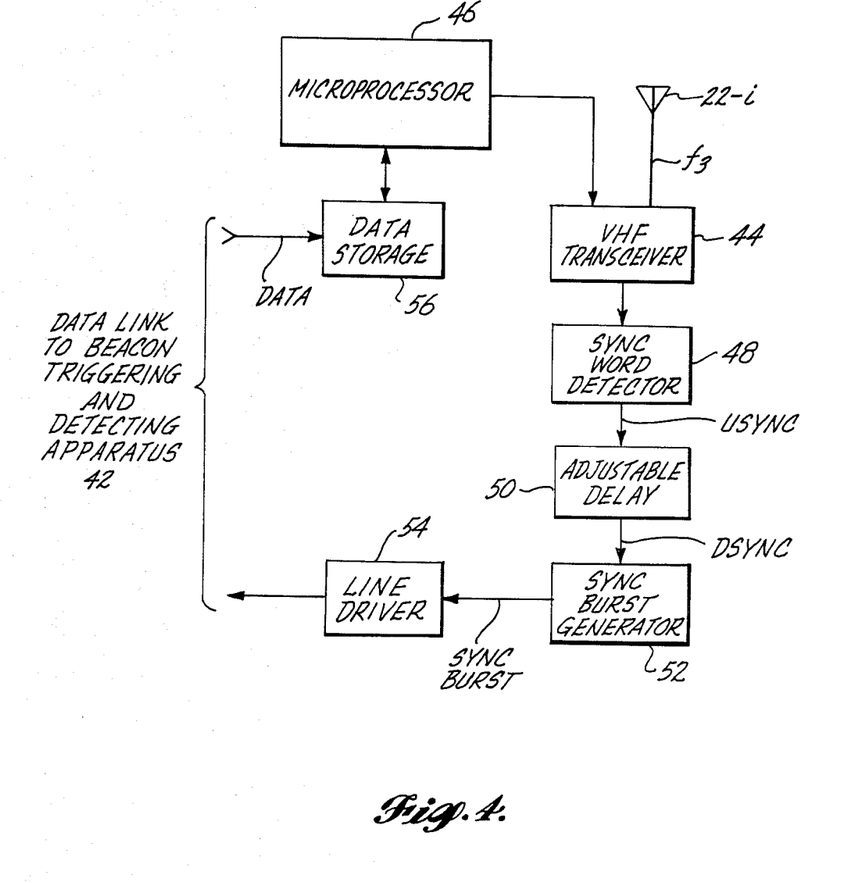
FIG. 4 is an electrical block diagram of the vehicle logic unit.

In FIG. 4, vehicle logic unit 40 is seen to include a VHF transceiver 44 coupled to antenna 22-i and also receiving control signals from a microprocessor 46, a sync word detector 48, an adjustable delay circuit 50, a sync burst generator 52, a line driver 54 coupled to a first portion of the data link with the beacon triggering and detecting apparatus 42, and a data storage 56 coupled to a second portion of the data link and interconnected with microprocessor 46.

Figure 6:
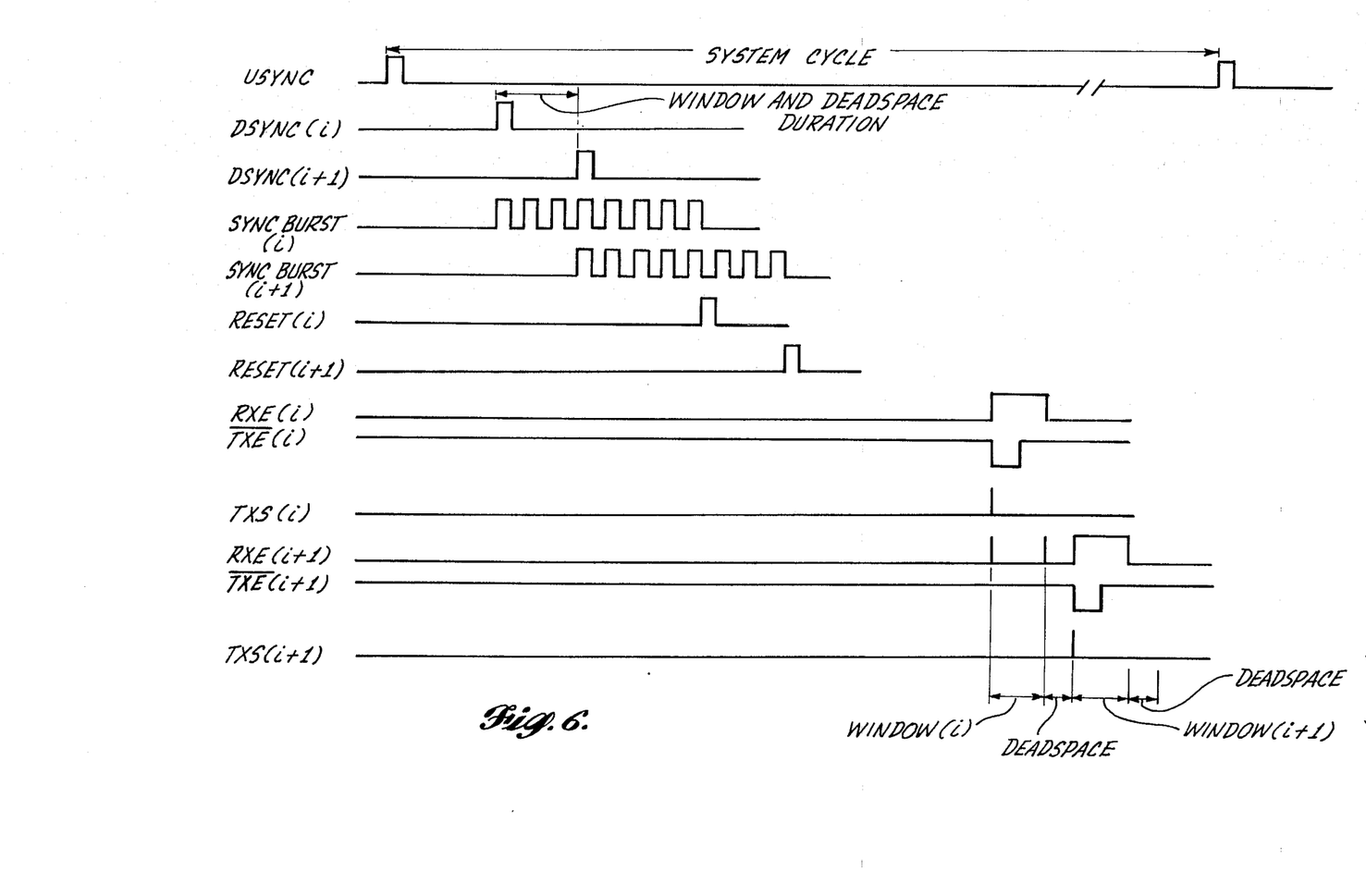
FIG. 6 is a timing diagram illustrating synchronization of the system.

All signals at frequency $f_3$ that are received by antenna 22-i are detected and demodulated by VHF transceiver 44 and supplied to microprocessor 46 and sync word detector 48. In the case where the received signal is a synchronizing signal, the sync word therein is detected by sync word detector 48 which responsively provides an USYNC pulse to adjustable delay circuit 50. Ideally, the USYNC pulses in all of the vehicle logic units are precisely coincident and occur with a period (e.g., 10.24 seconds) equal to that of the system cycle as seen in FIG. 6. The USYNC pulse is delayed in adjustable delay circuit 50 by an amount related to the desired time occurrence of the unique window assigned to the associated beacon triggering and detecting apparatus and appears at the output of adjustable delay circuit 50 as the DSYNC pulse. With reference to FIG. 6, it can be seen that pulses DSYNC (i) and DSYNC (i+1) provided by the adjustable delay circuit 50 in the vehicle logic units at vehicles VHi and VH(i+1) are spaced in time from each other by an amount (e.g., 160 milliseconds) that is equal to the duration of the window (which is the same for all windows, e.g. 106.67 milliseconds) and the duration of a "dead space" (e.g., 53.33 milliseconds) that is desirable to reduce the possibility of window overlap due to drift in the actual time occurrences of the windows. Accordingly, the DSYNC pulses are spaced in time by integral multiples of 160 milliseconds, thereby permitting a total of 64 vehicles to operate during each system cycle. The DSYNC pulse from adjustable delay circuit 50 causes sync burst generator 52 to provide a SYNC BURST signal comprising a predetermined number of cycles at a predetermined frequency. As can be seen from FIG. 6, signals SYNC BURST (i) and SYNC BURST (i+1) at vehicles VHi and VH(i+1) are also spaced in time from each other by the duration of the window and the dead space.

Figure 5:
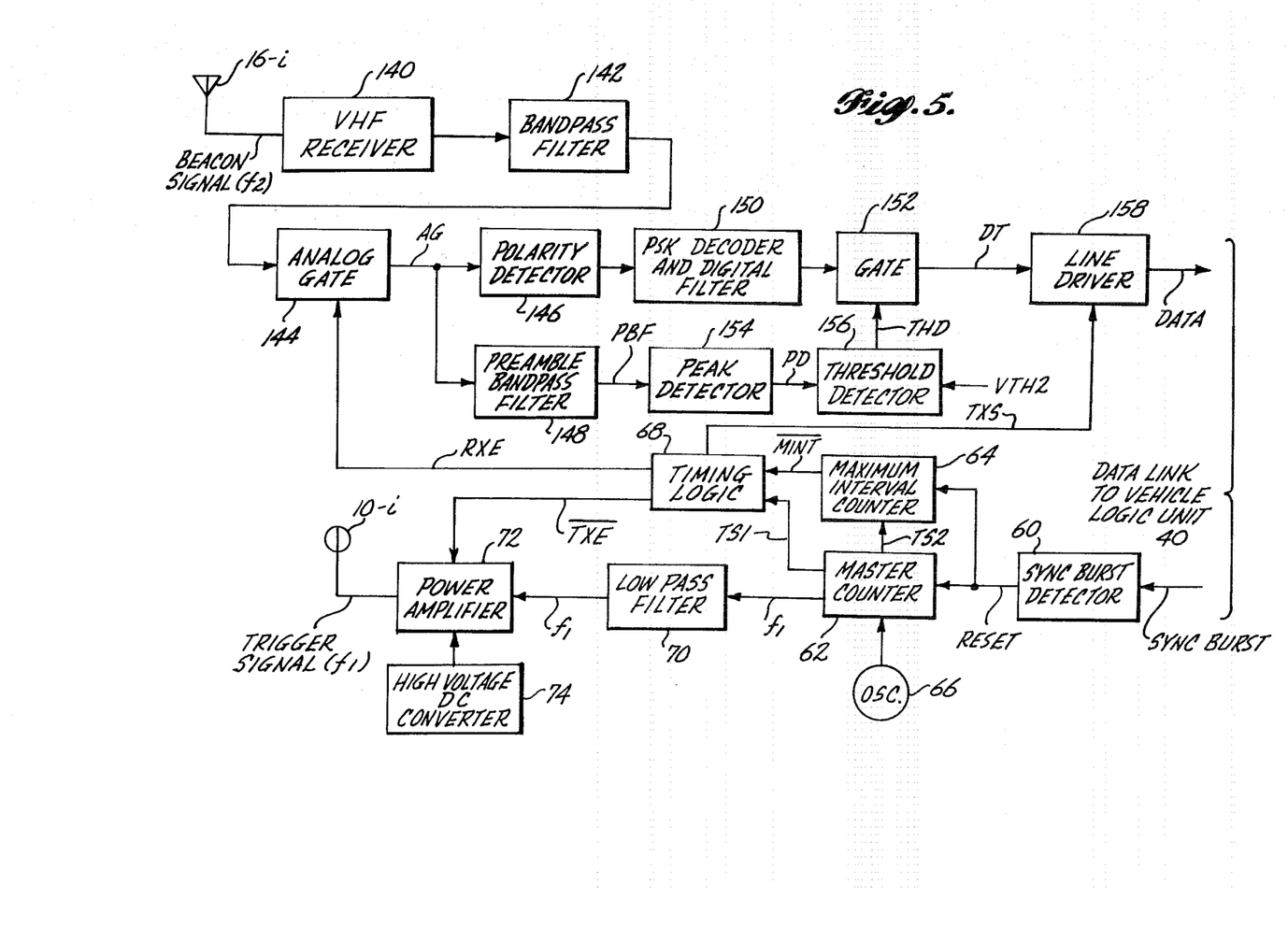
FIG. 5 is an electrical block diagram of the beacon triggering and detecting apparatus.

The SYNC BURST signal from sync burst generator 52 is transmitted by line driver 54 and the first portion of the data link to the beacon triggering and detecting apparatus detailed in FIG. 5. A sync burst detector 60 is responsive to integrate the successive cycles of the SYNC BURST signal and to provide a RESET pulse at substantially the termination of the SYNC BURST signal. With reference to FIG. 6, it will be seen that pulses RESET (i) and RESET (i+1) at vehicles VHi and VH(i+1) are also spaced in time by the duration of the window and the dead space. The RESET pulse is applied to a master counter 62 and a maximum interval counter 64. Master counter 62 receives an output signal at a predetermined frequency (e.g., 2.4576 MHz) from an oscillator 66 which is a highly-stable crystal oscillator of a type similar to that of oscillator 30 in base station 18, and responsively provides timing signals TS1 to a timing logic circuit 68 and a timing signal TS2 to maximum interval counter 64. Each RESET pulse resets master counter 62 so that timing signals TS1 cause timing logic circuit 68 to provide output signals RXE, $\overline{TXE}$, and TXS at fixed and predetermined times following the reset of master counter 62. With reference to FIG. 6, signal RXE (i) goes to a high logic level, signal $\overline{TXE}$ (i) goes to a low logic level, and signal TXS (i) goes to a high logic level at a predetermined time following the RESET (i) pulse to signify the start of the unique window assigned to vehicle VHi. Signal RXE (i) remains at a high logic level for the duration of the window (e.g., 106.67 milliseconds) and signal $\overline{TXE}$ (i) reamins at a low logic level for an initial portion of this window (e.g., 53.33 milliseconds). Signal TXS (i) remains at a high logic level for a very short period of time (e.g., 1.67 milliseconds) and is used as described hereinafter to signify to the vehicle logic unit that data from the beacon triggering and detecting apparatus is being transmitted thereto. Likewise, signal RXE (i+1) goes to a high logic level, signal $\overline{TXE}$ (i+1) goes to a low logic level, and signal TXS (i+1) goes to a high logic level at a predetermined time following the RESET (i+1) pulse, and these signals remain at these logic levels for periods of time identical to those described above to accordingly define the unique window associated with vehicle VH(i+1). Because of the time separation between the RESET (i) and RESET (i+1) pulses, the termination of the window associated with vehicle VHi and the initiation of the window associated with vehicle VH(i+1) are spaced in time by the dead space (e.g., 53.33 milliseconds).

Signal RXE is used to enable the detecting portion of the beacon triggering and detecting apparatus, as described hereinafter, and signal $\overline{\text{TXE}}$ is used to enable the triggering portion of the beacon triggering and detecting apparatus, as will now be described. Master counter 62 also provides an output signal at frequency $f_1$ (e.g., 153.6 kHz) to a low pass filter 70 which responsibly provides a sinusoidal output signal (also at frequency $f_1$) to a power amplifier 72. A voltage sufficient to drive power amplifier 72 is obtained from a high voltage dc converter 74 connected to the vehicle's power source, and power amplifier 72 is enabled whenever signal $\overline{\text{TXE}}$ has a low logic level to amplify the utput signal from low pass filter 70 so as to develop the trigger signal which is transmitted via transmit loop 10-i. Power amplifier 72 is designed so as to deliver a substantially constant amount of power (e.g., 100 watts) into transmit loop 10-i, transmit loop 10-i is designed so as to be resonant of frequency $f_1$ and so as to radiate a substantially omnidirectional electromagnetic field in a plane perpendicular to its loop axis, and frequency $f_1$ is chosen so that the intensity of the magnetic field component of this electromagnetic field decays as the cube of radial distance from transmit loop 10-i at all points within the desired beacon trigger range. It is well known that the intensity of the magnetic field component of an electromagnetic field decays: as the cube of distance from a small radiator (such as transmit loop 10-i) at points proximate to the radiator; as the square of distance at points further away from the radiator; and, in proportion to distance at points yet further away from the radiator. It is also well known that the distance at which the intensity variation of the magnetic field component of an electromagnetic field has a substantially square low variation is equal to the wave length of the electromagnetic field divided by $2\pi$. Given the above, it can be seen that if a radial distance from transmit loop 10-i is chosen that is greater than the maximum beacon trigger range, the frequency $f_1$ can be determined as follows:

$$\lambda/2\pi = \text{radial distance}$$

Since $\lambda = c/f$, with c being the velocity of propagation of the electromagnetic field through air, the above relation can be rewritten as:

$$f_1 = \frac{c}{2\pi(\text{radial distance})}$$

To give a specific example, let it be assumed that the maximum beacon trigger range is 300 meters. Using a somewhat greater radial distance of 311 meters, it can be seen that:

$$f_1 = \frac{3 \times 10^8 \text{ meters/sec}}{2\pi(311 \text{ meters})}$$

$$\cong 153.6 \text{ kHz}$$

The count within maximum interval counter 64 is advanced at periodic intervals by timing signal TS2 from master counter 62, and is reset to zero by each RESET pulse from sync burst detector 60. If communications between the base station and the vehicle are disrupted, no RESET pulse will be provided at the appropriate time by sync burst detector 60. The beacon triggering and detecting apparatus will continue to operate, however, inasmuch as master counter 62 is provided with an internal reset that occurs substantially at the time of each RESET pulse. The count within maximum interval counter 64, however, will continue to advance. If RESET pulses are continuously absent for an extended period of time (e.g., 10 minutes) that might result in window overlap due to drift in oscillator 66, maximum interval counter 64 provides a signal $\overline{\text{MINT}}$ to timing logic circuit 68 which disables timing logic circuit 68 to terminate further operation of the beacon triggering and detecting apparatus, with signal $\overline{\text{MINT}}$ persisting until such a time as communications between the base station and the vehicle again occur and maximum interval counter 64 is reset by a RESET pulse from sync burst deflector 60.

Figure 7:
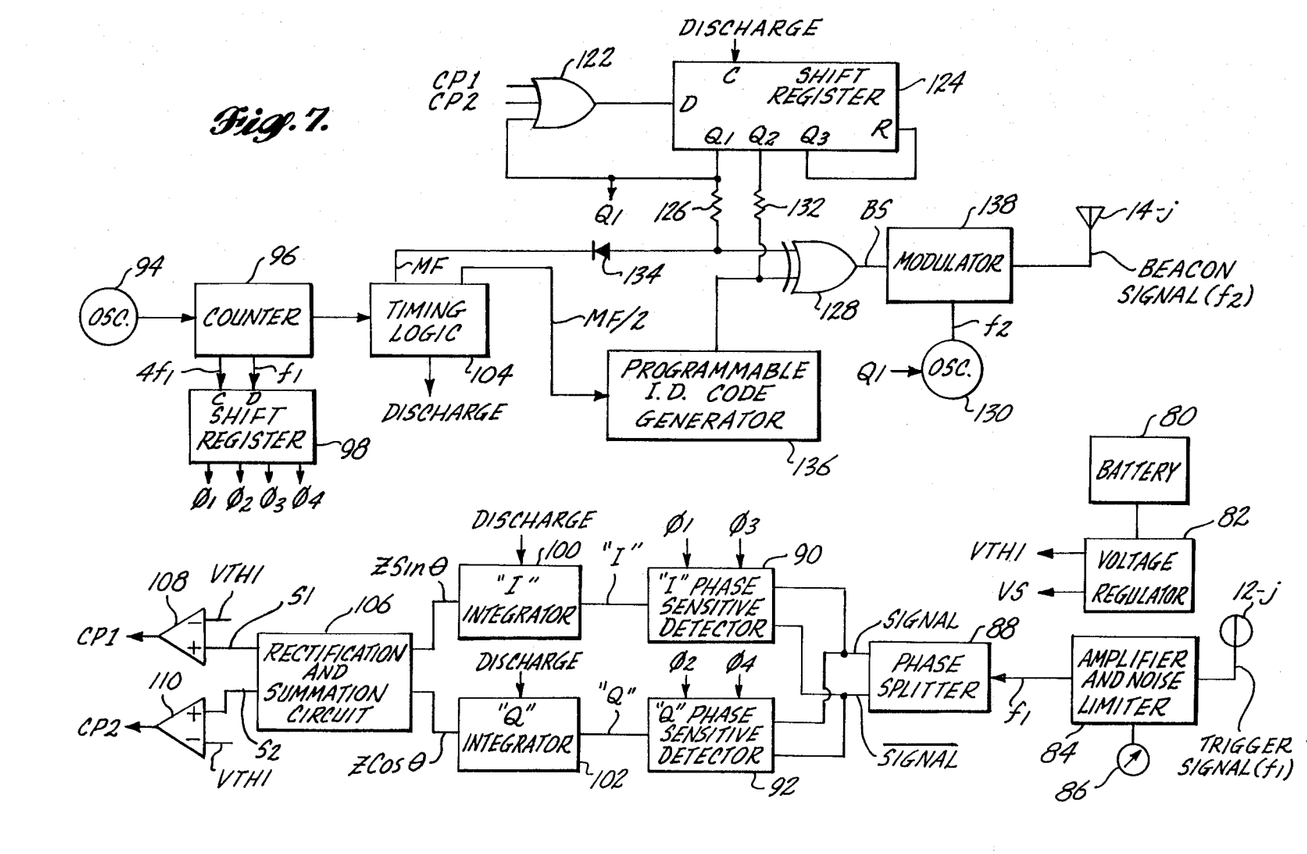
FIG. 7 is an electrical block diagram of each beacon.

With reference now to FIG. 7, each beacon (such as beacon Bj) is powered by a battery 80 whose output voltage is regulated by a voltage regulator 82 which responsively provides supply voltage VS to the various components of the beacon and a threshold voltage VTH1 for the purposes to be hereinafter described. Receive loop 12-j (which includes a Faraday shield but which is otherwise constructed in a manner similar to that of transmit loop 10-i) is coupled to the input of an amplifier and noise limiter 84 which functions to amplify any signals received by receive loop 12-j (including the trigger signal at frequency $f_1$) and yet limit the amplitude of any noise in such signals. Amplifier and noise limiter 84 is designed to provide a highly-stable gain up to its limiting point, which gain can be adjusted through a control 86. As previously discussed, the trigger signal from the beacon triggering and detecting apparatus has a substantially constant amplitude, and control 86 is used to adjust the relative amplitude of the output signal from amplifier and noise limiter 84 (which output signal includes the trigger signal) so as to vary the beacon trigger range in a manner to be described.

Figure 9:
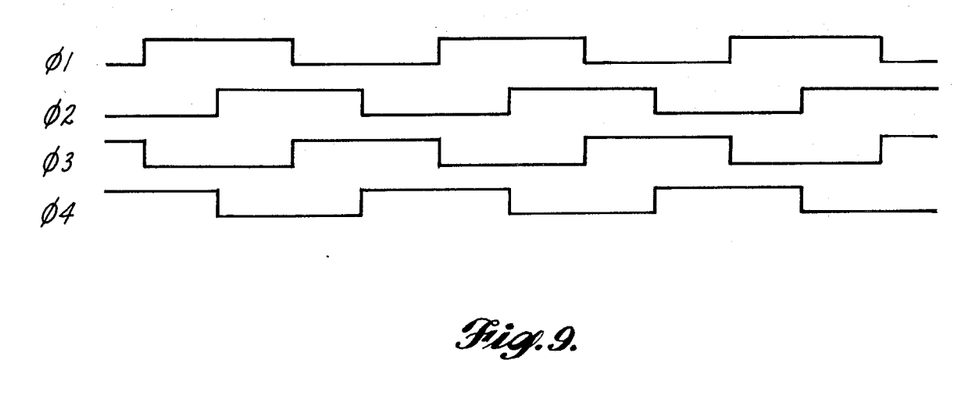
FIG. 9 is a timing diagram illustrating certain reference signals used in the beacon of FIG. 7.

The output signal from amplifier and noise limiter 84 is coupled to the input of a phase splitter 88 (which may comprise an inversely-coupled transformer) which provides output signals SIGNAL and $\overline{\text{SIGNAL}}$ representing, respectively, the output signal from amplifier and noise limiter 84 and that output signal shifted in phase by 180°. SIGNAL and $\overline{\text{SIGNAL}}$ are applied to the inputs of an in-phase or "1" phase sensitive detector 90 and a quadrature or "Q" phase sensitive detector 92. Signals $\phi 1$ and $\phi 3$ are supplied to other inputs of detector 90 and signals $\phi 2$ and $\phi 4$ are supplied to other inputs of detector 92. A highly-stable crystal oscillator 94 provides an output signal at a predetermined frequency (e.g., 1.2288 MHz) to a counter 96 which responsively provides an output signal at frequency $f_1$ to the data (D) input of a shift register 98 and an output signal at frequency $4f_1$ to the clock (C) input of shift register 98. There are four successive stages in shift register 98, and shift register 98 functions to enter a bit therein at frequency $f_1$ and to shift this bit through its stages at frequency $4f_1$, whereupon output signals $\phi 1$, $\phi 2$, $\phi 3$ and $\phi 4$ produced by these stages are reference signals at frequency $f_1$ with, respectively, 0° phase shift, 90° phase shift, 180° phase shift, and 270° phase shift (see FIG. 9).

Detector 90 includes an arrangement of gates that are responsive to signals $\phi 1$ and $\phi 3$ to couple $\overline{\text{SIGNAL}}$ to the output of detector 90 when $\phi 3$ has a high logic level and to couple SIGNAL to the output of detector 90 when signal $\phi 1$ has a high logic level. Likewise, detector 92 includes an arrangement of gates that are responsive to signals $\phi 2$ and $\phi 4$ to couple $\overline{\text{SIGNAL}}$ to the output of detector 92 when signal $\phi 4$ has a high logic level and couple SIGNAL to the output of detector 92 when signal $\phi 2$ has a high logic level. It will be seen that the output signal "1" from detector 90 comprises the in-phase component of any signal at receive loop 12-j that is at frequency $f_1$ and that the output signal "Q" from detector 92 comprises the quadrature component of any such signal. It also will be noted that any signals at receive loop 12-j that are not at frequency $f_1$ will be substantially attenuated by the synchronous detection afforded through detectors 90 and 92 and by the resonant characteristics of receive loop 12-j.

Output signal "1" is coupled to the signal input of an "1" integrator 100 and output signal "Q" is coupled to the signal input of a "Q" integrator 102. Counter 96 also supplies timing signals TS3 to a timing logic circuit 104 which responsively provides a series of periodic DISCHARGE pulses to integrators 100 and 102 and which also provides a signal MF at the desired modulation frequency (e.g., 1200 Hz) of the beacon signal and a signal MF/2 at one-half the desired modulation frequency (e.g., 600 Hz). For reasons that will be apparent from the ensuing discussion, the period of the DISCHARGE pulses is chosen to be one-half the period of the transmit portion of the window (e.g., one-half of the time that signal $\overline{\text{TXE}}$ has a low logic level). Each DISCHARGE pulse discharges integrators 100 and 102, and the output signals from integrators 100 and 102 ramp upwardly from a "zero" level and with a slope proportional to the amplitude of the input signals thereto ("1", "Q") between successive DISCHARGE pulses so that the output signals represent, respectively, the in-phase component of the signal at receive loop 12-j at frequency $f_1$ over the integration period (or, $Z \sin \theta$) and the quadrature component (or, $Z \cos \theta$). In order to develop a signal that represents the resultant vector Z of signals $Z \sin \theta$ and $Z \cos \theta$ and which is thus proportional to the amplitude of the signal at receive loop 12-j at frequency $f_1$, signals $Z \sin \theta$ and $Z \cos \theta$ may be supplied to a conventional root-mean-square circuit. For the purpose of reducing power consumption by the beacon, however, the following approximation to a root-mean-square function is used:

$$Z = \text{the greater of}$$
$$K_1|Z \sin \theta| + K_2|Z \cos \theta|$$
$$\text{or}$$
$$K_1|Z \cos \theta| + K_2|Z \sin \theta|$$

where $K_1$ and $K_2$ are constants chosen to produce minimum error in the approximation (e.g., $K_1 = 0.961$ and $K_2 = 0.398$).

To implement this approximation, $Z \sin \theta$ and $Z \cos \theta$ are applied to respective inputs of a rectification and summation circuit 106 which functions to rectify $Z \sin \theta$ and $Z \cos \theta$ and to produce therefrom output signals S1 and S2 representing, respectively, $K_1|Z \sin \theta| + K_2|Z \cos \theta|$, and $K_1|\cos \theta| + K_2|Z \sin \theta|$. Signal S1 is applied to the noninverting input of a comparator 108, signal S2 is applied to the noninverting input of comparator 110, and the threshold voltage VTH1 is applied to the inverting inputs of comparators 108 and 110. Normally, output signals CP1 and CP2 from comparators 108 and 110 are at a low logic level; however, when the amplitude of signals S1 and S2 exceed the amplitude of threshold voltage VTH1, output signals CP1 and CP2 are at a high logic level. As will be explained in detail hereinafter, a high logic level in either of signals CP1 or CP2 is used to enable transmission of a beacon signal by the beacon.

Figure 8:
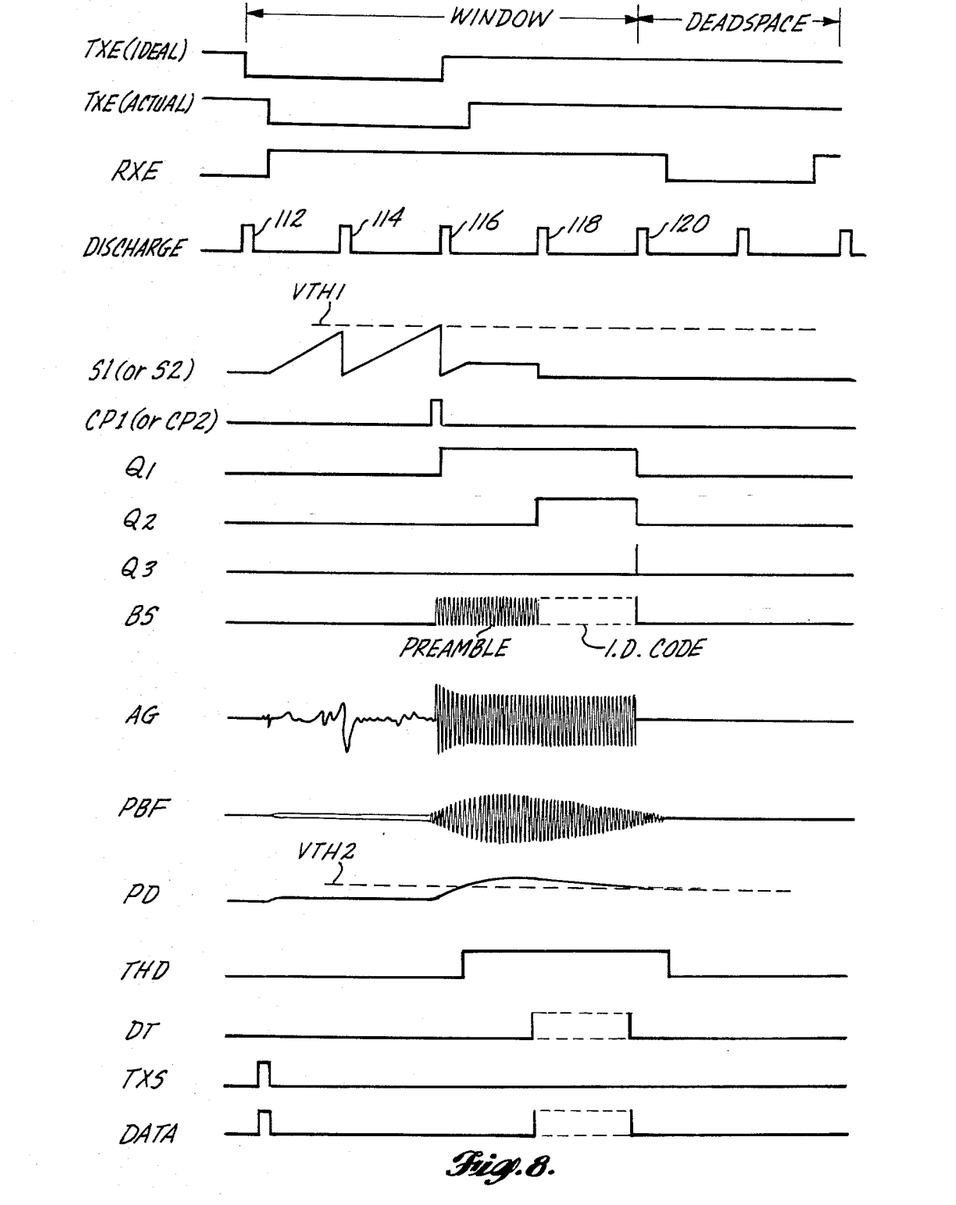
FIG. 8 is a timing diagram illustrating the overall operation of the system.

With additional reference now to FIG. 8, a situation is illustrated therein in which the actual time occurrence of the window assigned to a given vehicle (represented by $\overline{\text{TXE}}$ (actual) and RXE) has been slightly delayed from the desired time occurrence of that window (represented by $\overline{\text{TXE}}$ (ideal)), and in which the given vehicle is just within the beacon trigger range. A DISCHARGE pulse 112 occurs just before initiation of the trigger signal (represented by $\overline{\text{TXE}}$ (actual)) and successive DISCHARGE pulses 114 and 116 occur during the trigger signal. Since the period of the DISCHARGE pulses is one-half the duration of the trigger signal, it can be seen that at least two such DISCHARGE pulses will occur during the trigger signal notwithstanding advances or delays therein to thereby permit at least one full period of integration of the trigger signal. If the period of the DISCHARGE pulse is less than one-half the duration of the trigger signal, the bandpass of the filtering provided by integration of the trigger signal increases so as to decrease the signal-to-noise ratio in trigger signal detection, and if the period of the DISCHARGE pulses is greater than one-half the duration of the trigger signal, an advance or delay in the actual time occurrence of the trigger signal may result in the trigger signal being integrated over less than one full period of integration so as to result in loss of detection of a trigger signal from a vehicle that is at or just within the beacon trigger range. Upon the occurrence of DISCHARGE pulse 112, integrators 100 and 102 are discharged. Upon the subsequent initiation of the trigger signal, signals $Z \sin \theta$ and $Z \cos \theta$ from integrators 100 and 102 (and thus signals S1 and S2 from rectification and summation circuit 106) ramp upwardly with a slope determined by the amplitude of signals "1" and "Q" and therefore the amplitude of the output signal from amplifier and noise limiter 84. Upon the occurrence of the next DISCHARGE pulse 114, neither signal S1 nor signal S2 has reached the amplitude of threshold voltage VTH1 (due to the fact that the vehicle is just within the beacon trigger range), whereupon DISCHARGE pulse 114 again discharges integrators 100 and 102. Since the trigger signal is still being provided, signals S1 and S2 again ramp upwardly upon termination of DISCHARGE pulse 114. Since signals "1" and "Q" are now being integrated over a full period of integration, either signal S1 or S2 (or both signals) reaches the amplitude of the threshold voltage VTH1 shortly before the occurrence of the next DISCHARGE pulse 116, whereupon either signal CP1 or signal CP2 (or both signals) goes to a high logic level.

From the foregoing, it can be appreciated that the beacon trigger range is represented by that amplitude of the output signal from amplifier and noise limiter 84 that causes either signal S1 or signal S2 to exceed the amplitude of threshold voltage reference VTH1 shortly before the occurrence of a DISCHARGE pulse. Given the fact that each trigger signal has a substantially constant amplitude, it can also be appreciated that the beacon trigger range can be adjusted by varying, through control 86, the gain of amplifier and noise limiter 84 and thus the relative amplitude of the output signal therefrom. For a given beacon trigger range, it will be appreciated that the trigger signal from a beacon well within the beacon trigger range will cause either signal S1 or signal S2 to exceed the amplitude of threshold voltage VTH1 at a time before that illustrated in FIG. 8. Conversely, the trigger signal from a vehicle outside the beacon trigger range will not result in either signal S1 or S2 exceeding the amplitude of threshold voltage VTH1 during any integration period.

Signals CP1 and CP2 are applied to respective inputs of an OR gate 122 whose output is coupled to the data (D) input of a shift register 124. The DISCHARGE pulses are applied to the clock (C) input of shift register 124, and output signals Q1, Q2 and Q3 appear on three successive stages of shift register 124. Output signal Q1 is coupled to a third input of OR gate 122, is coupled via a resistor 126 to a first input of an EXCLUSIVE-OR gate 128, and is coupled to an oscillator 130. Output signal Q2 is coupled via a resistor 132 to a second input of EXCLUSIVE-OR gate 128, and output signal Q3 is coupled to a reset (R) input of shift register 124. Signal MF from timing logic circuit 104 is coupled via a diode 134 to the first input of EXCLUSIVE-OR gate 128, and signal MF/2 from timing logic circuit 104 is coupled to the input of a programmable I.D. code generator 136 whose output is coupled to the second input of EXCLUSIVE-OR gate 128.

Oscillator 130 is a highly-stable crystal oscillator that provides on output signal at the desired frequency $f_2$ (e.g., 49.86 MHz) of the beacon signal when oscillator 130 is enabled by a high logic level in signal Q1. The output signal from oscillator 130 and an output signal BS from EXCLUSIVE-OR gate 128 (which represents the information to be included in the beacon signal) are supplied to respective inputs of a modulator 138 which functions to amplitude-modulate signal BS on the output signal from oscillator 138 to produce the beacon signal (at frequency $f_2$) which is coupled to antenna 14-j and transmitted thereby.

With additional reference to FIG. 8, the detection of a trigger signal by the beacon causes either signal CP1 or signal CP2 to go to a high logic level, whereby the output signal from OR gate 122 also goes to a high logic level to insert a bit into shift register 124. Let it be assumed that all stages in shift register 124 have been previously reset or cleared. When a bit is shifted into shift register 124, output signal Q1 goes to a high logic level and output signals Q2 and Q3 remain at a low logic level. Whenever output signal Q1 is at a high logic level, oscillator 130 is enabled and diode 134 is forward-biased through resistor 126 so that signal MF (which is at the modulation frequency) is coupled to the first input of EXCLUSIVE-OR gate 128. Immediately following the time that output signal Q1 has gone to a high logic level, output signal Q2 is at a low logic level to maintain (through resistor 132) the signal at the second input of EXCLUSIVE-OR gate 128 at a low logic level (as will be appreciated from the following discussion). As a result, signal MF appears at the output of EXCLUSIVE-OR gate 128 as signal BS and causes modulator 138 to initially modulate the output signal from oscillator 130 with the modulation frequency. Accordingly, the beacon signal has an initial "preamble" portion of modulation that is only at the modulation frequency and which is used for certain purposes by the beacon triggering and detecting apparatus as described hereinafter.

Upon the occurrence of the next DISCHARGE pulse 118, the bit within shift register 124 is shifted to the next stage therein and reintroduced (through OR gate 122) to the first stage therein, whereupon both output signals Q1 and Q2 are now at a high logic level. Generator 136 is designed and programmed so that the output signal therefrom is an I.D. code that represents the identity or location of the beacon and that comprises a series of successive ones (each at a high logic level) and zeroes (each at a low logic level) at twice the rate of signal MF/2 (which is one-half the modulation frequency). Whenever the output signal from generator 136 is at a high logic level, the high logic level in output signal Q2 from shift register 124 maintains (through resistor 132) the signal at the second input of EXCLUSIVE-OR gate 128 at a high logic level whereby output signal BS from EXCLUSIVE-OR gate 128 comprises signal MF, and whenever the output signal from generator 136 is at a low logic level, this low logic level pulls down the logic level of the signal at the second input of EXCLUSIVE-OR gate 128 whereby output signal BS from EXCLUSIVE-OR gate 128 comprises $\overline{MF}$. Accordingly, generator 136, EXCLUSIVE-OR gate 128 and modulator 138 provide PSK encoding of the I.D. code on the output signal from oscillator 130, so that the beacon signal has an "I.D. code" portion of modulation that is either of the modulation frequency (where the code has successive ones or successive zeroes) or at one-half the modulation frequency (where the code has a one or zero and a successive zero or one).

Upon the occurrence of the next DISCHARGE pulse 120, output signal Q3 goes to a high logic level (and output signals Q1 and Q2 remain at a high logic level). Shortly after this time, shift register 124 is reset or cleared by output signal Q3, whereupon output signals Q1, Q2 and Q3 each go to a low logic level. When output signal Q1 goes to a low logic level, oscillator 130 is disabled so as to terminate the beacon signal and the beacon is thereafter available for triggering by yet another trigger signal.

To summarize, the modulation in the beacon signal includes a preamble portion and a successive I.D. code portion. The preamble portion has a duration that is no greater than the period of the DISCHARGE pulses (which period is one-quarter the duration of the window) and the I.D. code portion has a fixed duration that is equal to the period of the DISCHARGE pulses to accordingly permit the transmission of a fixed-length message to the beacon triggering and detecting apparatus.

With reference again to FIG. 5, the beacon signal is received by antenna 16-i and coupled to the input of a VHF receiver 140. Included in VHF receiver 140 are an RF amplifier for amplifying any RF signals received by antenna 16-i, an oscillator providing an output signal at a predetermined frequency (e.g., 41.86 MHz), a mixer receiving the output signals from the RF amplifier and the oscillator and providing an output signal including a desired IF frequency (e.g., 8 MHz), an IF buffer amplifier receiving the output signal from the mixer, an IF bandpass filter (whose center frequency is the desired IF frequency) receiving an output signal from the IF buffer amplifier, an IF amplifier receiving an output signal from the IF bandpass filter, a detector for detecting any modulation in an output signal from the IF amplifier, and an AGC circuit responsive to an output signal for the detector (which includes the modulation frequency) that is operative to regulate the gain of the RF and IF amplifiers to maintain the amplitude of the output signal from the detector at a substantially constant value. It will be noted that the preamble portion of the modulation in the beacon signal gives the AGC circuit sufficient time to stabilize the gain of the RF and IF amplifiers to ensure that the I.D. code portion of the modulation has a substantially constant amplitude.

The output signal from VHF receiver is applied to the input of a bandpass filter 142 which has a fairly broad bandwidth centered about the modulation frequency and which functions to substantially attenuate noise and interference. The output signal from bandpass filter 142 is applied to the input of an analog gate 144 which also receives signal RXE from timing logic circuit 68. With additional reference now to FIG. 8, analog gate 144 is open whenever signal RXE has a high logic level (e.g., during the window assigned to the beacon triggering and detecting apparatus). During this initial portion of this window (e.g., during the time that signal $\overline{\text{TXE}}$ has a low logic level and the trigger signal is being provided), an output signal AG from analog gate 144 comprises noise and interference that has passed through VHF receiver 140 and bandpass filter 142. However, upon occurrence of the preamble portion and then the I.D. code portion of the modulation in the beacon signal, output signal AG from analog gate 144 comprises those portions of the modulation. It will be noted that since analog gate 144 is open only for the duration of the window assigned to the beacon triggering and detecting apparatus, any beacon signals that have been precluded as a result of any other beacon triggering and detecting apparatus do not pass through analog gate 144.

Output signal AG from analog gate 144 is coupled to the input of a polarity detector 146 and to the input of a preamble bandpass filter 148. Polarity detector 146 functions to produce defined high and low logic levels from the modulation applied thereto, and the output signal therefrom is applied to the input of a PSK decoder and digital filter circuit 150. Within circuit 150, any PSK encoding in the signal applied thereto is extracted and converted to a series of ones and zeroes corresponding identically to the output from programmable I.D. code generator 136 (FIG. 7) and any jitter in the modulation is substantially removed by the digital filter. The output signal from circuit 150 is applied to the input of a gate 152.

Preamble bandpass filter 148 has a very narrow bandwidth centered about the modulation frequency, and an output signal PBF therefrom slowly rises in amplitude during the preamble portion of the modulation in the beacon signal. Output signal PBF is applied to the input of a peak detector 154 (which may be a positive peak detector) and which functions to provide an output signal PD representing the amplitude envelope of signal PBF. Output signal PD is applied to the input of a threshold detector 156 which also receives a threshold voltage VTH2. If the preamble portion of the modulation in the beacon signal is present and persists for a predetermined period of time, the amplitude envelope represented by signal PD rises above threshold voltage VTH2 at a time before occurrence of the I.D. code portion of the modulation, whereby threshold detector 156 provides an output signal THD to gate 152 which opens gate 152 so as to permit the sequence of ones and zeroes that correspond to the I.D. code portion of the modulation and that represent the identity or location of the beacon to be passed therethrough.

It will be noted that during the I.D. code portion of the modulation, output signal PBF from preamble bandpass filter 148 slowly decreases in amplitude from the maximum amplitude obtained during the preamble portion of the modulation, due to the fact that the I.D. code portion is sometimes at one-half the modulation frequency. To avoid threshold detector 156 from terminating output signal THD due to this drop in amplitude, threshold detector 156 is internally latched for a predetermined period of time following threshold detection that is sufficient to allow the entire sequence of ones and zeroes corresponding to the I.D. code portion of the modulation to pass through gate 152. It will also be noted that any noise and interference at the modulation frequency that passes through preamble bandpass filter 148 will not result in threshold detection inasmuch as such noise and interference will not persist for the period of time required for threshold detection.

Output signal DT from gate 152, representing the sequence of ones and zeroes corresponding to the identity or location of the beacon, and signal TXS from timing logic circuit 68 are applied to the inputs of a line driver 158 which responsively outputs such signals as DATA to the vehicle logic unit through the data link. With reference again to FIG. 4, DATA is supplied to the vehicle logic unit through the data link and is stored in data storage 56. Microprocessor 46 is operative to interrogate data storage 56 and to determine from such interrogation if information relating to the identity or location of the beacon has been stored therein (by detecting the portion of DATA corresponding to the signal TXS). In response to a polling signal from base station 18 received by antenna 22-i and coupled to microprocessor 46 through VHF transceiver 44, microprocessor 46 is further operative to extract the information representing beacon identity or location from data storage 56 and to cause VHF transceiver 44 to transmit such information to the base station for further processing and display as previously indicated.

While the invention has been described with reference to a preferred embodiment, it is to be clearly understood by those skilled in the art that the invention is not limited thereto, but, rather that the scope of the invention is to be interpreted only in conjunction with the appended claims.

The embodiments of the invention in which an exclusive property or privilege is claimed are defined as follows:

1. An information system for communicating information from a location to a mobile object, said system comprising:
   a beacon triggering and detecting apparatus mounted on the object, said beacon triggering and detecting apparatus including: means for transmitting a substantially-omnidirectional trigger signal at a first RF frequency, said trigger signal as transmitted having a substantially constant amplitude and said first RF frequency being chosen so that the amplitude of said trigger signal decays, from said substantially constant amplitude, substantially as the cube of radial distance from the object at all points within a predetermined beacon trigger range surrounding the object;
   a beacon mounted at the location, said beacon including: a continuously-enabled means that is operative to receive said trigger signal and to detect said trigger signal only when the object is at a distance from the location within said beacon trigger range and the amplitude of said trigger signal as received equals or exceeds a predetermined threshold value; and, means that is enabled in response to detection of said trigger signal to transmit a beacon signal at a second RF frequency substantially greater than said first RF frequency, said beacon signal containing information desired to be communicated from the location to the object;

and wherein said beacon triggering and detecting apparatus further includes: means receiving and detecting said beacon signal and extracting the information contained therein.

2. A system as recited in claim 1, wherein said information in said beacon signal represents the location of said beacon.

3. A system as recited in claim 1, wherein said means, in said beacon triggering and detecting apparatus, for transmitting said trigger signal comprises: a substantially-omnidirectional transmit loop; and, means for applying a substantially constant amplitude signal at said first RF frequency to said transmit loop so as to result in transmission of said trigger signal by said transmit loop.

4. A system as recited in claim 1, wherein said trigger signal has a substantially constant duration; and, wherein said means, in said beacon, for receiving and detecting said trigger signal comprises: a substantially-omnidirectional receive loop; an amplifier for amplifying signals received by said receive loop and providing corresponding output signals; means for synchronously detecting any output signals from said amplifier that are substantially at said first RF frequency and for providing first and second output signals representing, respectively, the in-phase and quadrature components of said detected output signals; first and second integrators for respectively integrating said first and second output signals over a predetermined integration period and for providing corresponding first and second integrator output signals; means combining said first and second integrator output signals to develop a third output signal whose amplitude represents the resultant vector of said detected output signals over said integration period; means providing a threshold signal; and, comparator means for comparing said third output signal with said threshold signal and for signifying detection of said trigger signal whenever the amplitude of said third output signal exceeds that of said threshold signal.

5. A system as recited in claim 4, wherein said threshold signal has a substantially constant amplitude, and wherein said means, in said beacon, for receiving and detecting further comprises means for selectively adjusting the gain of said amplifier and therefore the extent of said beacon trigger range.

6. A system as recited in claim 4, wherein said first and second integrator output signals represent, respectively, the in-phase component $Z \sin \theta$ of said detected output signals over said integration period and the quadrature component $Z \cos \theta$ of said detected output signals over said integration period; wherein said means for combining is operative to provide signals S1 and S2 representing, respectively, $K_1|Z \sin \theta| + K_2|Z \cos \theta|$ and $K_1|Z \cos \theta| + K_2|Z \sin \theta|$; and, wherein said comparator means is operative to signify detection of said trigger signal whenever the amplitude of either signal S1 or signal S2 exceeds the amplitude of said threshold signal.

7. An information system for communicating information from each of a plurality of separate locations to each of a plurality of mobile objects, said system comprising:

a plurality of beacon triggering and detecting apparatus, each said apparatus being associated with and mounted on one of the objects and including: first means for transmitting a substantially-omnidirectional trigger signal at a first RF frequency, said trigger signal as transmitted having a substantially constant amplitude and said first RF frequency being chosen so that the amplitude of said trigger signal decays, from said substantially constant amplitude, substantially as the cube of radial distance from the associated object at all points within a predetermined beacon trigger range surrounding the associated object; second means receiving and detecting a beacon signal and extracting any information therein; and, third means enabling said first means and said second means only during an associated and unique one of a plurality of successive windows occurring in a repetitive system cycle, each of said plurality of windows having substantially the same duration; and, a plurality of beacons, each said beacon being associated with and mounted at one of the locations and including: fourth means that is continuously enabled and that is operative to receive trigger signals from said plurality of beacon triggering and detecting apparatus and to detect a trigger signal that has been received from any one of said plurality of beacon triggering and detecting apparatus only when the associated object is at a distance from the location of the beacon that is within said beacon trigger range and the amplitude of said received trigger signal equals or exceeds a predetermined threshold value; and, fifth means that is enabled only in response to said detection of a trigger signal to transmit a beacon signal within a predetermined period of time following said detection that is within the unique window of said one of said plurality of beacon triggering and detecting apparatus, said beacon signal being at a second RF frequency that is substantially greater than said first RF frequency and said beacon signal including information desired to be communicated from the location of said beacon to the objects.

8. A system as recited in claim 7, wherein said third means in each said beacon triggering and detecting apparatus is operative to enable said first means therein during an initial portion of the associated window so that said trigger signal is transmitted only during said initial portion, and wherein said third means is further operative to enable said second means therein throughout the associated window so that said beacon signal may be received and detected at any time during the associated window.

9. A system as recited in claim 8, wherein said predetermined period of time of transmission of said beacon signal is chosen so that said beacon signal is transmitted during a terminal portion of the associated window of said one of said plurality of beacon triggering and detecting apparatus.

10. A system as recited in claim 8, wherein said trigger signal has a substantially constant duration.

11. A system as recited in claim 10, wherein said fourth means in each said beacon includes: means for repetitively integrating a received trigger signal over a predetermined integration period; and, comparator means for signifying detection of a trigger signal whenever the integrated amplitude thereof exceeds a predetermined threshold amplitude.

12. A system as recited in claim 11, wherein said integration period is one-half the substantially constant duration of said trigger signal.

13. A system as recited in claim 11, wherein said threshold amplitude is substantially constant, and wherein said fourth means in each said beacon further comprises means for selectively adjusting the amplitude of a received trigger signal.

14. A system as recited in claim 8, wherein said initial portion has a substantially constant duration that is one-half the duration of the associated window.

15. A system as recited in claim 14, wherein said beacon signal has a substantially constant duration that is substantially equal to one-half the duration of each window.

16. A system as recited in claim 15, wherein said beacon signal includes a first portion of modulation and a successive, second portion of modulation representing encoded information to be communicated from the location.

17. A system as recited in claim 16, wherein said second means in each said beacon triggering and detecting apparatus comprises: means receiving said beacon signal and extracting said modulation portions therefrom; first gate means controlled by said third means therein and operative to pass said modulation portions therethrough only during the associated window; means decoding said passed second modulation portion and extracting said information therein; information storage means; and, second gate means passing said information to said information storage means only when said first modulation portion persists for a predetermined period of time.

18. A system as recited in claim 7, further comprising:
a base station including: a source of a synchronizing signal; and, means for transmitting said synchronizing signal at a third RF frequency distinct from said first and second RF frequencies;
and, object logic means associated with each said beacon triggering and detecting apparatus for receiving said synchronizing signal and for responsively controlling said third means therein to adjust the relative time occurrence of the associated window.

19. A system as recited in claim 18, wherein each said beacon triggering and detecting apparatus further includes means for disabling said third means therein whenever said synchronizing signal has failed to be received for a predetermined period of time that is likely to result in overlap of the associated window with the window associated with any other of said beacon triggering and detecting apparatus.

20. A system as recited in claim 18, wherein said base station is operative to transmit successive synchronizing signals at periodic intervals each substantially equal in duration to that of said system cycle.

21. A system as recited in claim 20, wherein each said beacon triggering and detecting apparatus includes means for disabling said third means therein upon the failure of said object logic means to receive a predetermined number of successive synchronizing signals.

22. A system as recited in claim 7, wherein said third means in each said beacon triggering and detecting apparatus comprises: a first oscillator; and, a master timer that is clocked by said first oscillator for enabling said first and second means therein and that is internally reset at periodic intervals equal in duration to that of said system cycle and at times corresponding to the relative time occurrences of the associated window.

23. A system as recited in claim 22, further comprising:
a base station including: a second oscillator; means clocked by said second oscillator for developing synchronizing signal at periodic intervals each substantially equal in duration to that of said system cycle; and, means for transmitting said synchronizing signal at a third RF frequency distinct from said first and second RF frequencies;
and, object logic means associated with each said beacon triggering and detecting apparatus and operative to: receive each said synchronizing signal; develop a universal synchronizing pulse from each said received synchronizing signal; developed a delayed synchronizing pulse from each said universal synchronizing pulse, said delayed synchronizing pulse being delayed in time from said universal synchronizing pulse by an amount related to the relative time occurrence of the associated window; provide a reset pulse at a predetermined time following each said delayed synchronizing pulse; and, externally reset said master timer at the time of each said reset pulse.

24. A system as recited in claim 23, wherein said third means in each said beacon triggering and detecting apparatus further includes a secondary timer clocked by said master timer and reset by each said reset pulse, said secondary timer being operative upon the absence of a predetermined number of successive ones of said reset pulses to disable said master timer until the occurrence of a successive reset pulse.

25. A system as recited in claim 7, further comprising:
object logic means associated with each said beacon triggering and detecting apparatus, said object logic means including: means for storing said information extracted from a beacon signal by said second means therein; and, means responsive to a polling signal at a third RF frequency distinct from said first and second RF frequencies for transmitting said stored information at said third RF frequency;
and, means at a central location for providing said polling signal to each of said object logic means and for receiving, processing and displaying the information provided by each of said object logic means in response to said polling signal.

* * * * *

UNITED STATES PATENT AND TRADEMARK OFFICE
CERTIFICATE OF CORRECTION

PATENT NO. : 4,533,871
DATED : August 6, 1985
INVENTOR(S) : Peter D. Boetzkes

It is certified that error appears in the above-identified patent and that said Letters Patent is hereby corrected as shown below:

Column [54], line 1: "RANGE-ENABLE" should be —RANGE-ENABLED—
(Title)
Column 1, lines 19 & 20: "interrogation/responder" should be —interrogator/responder—
(Amendment May 30, 1984)
Column 1, line 36:     "applications," should be —application—
    line 36:     "larger" should be —large—
    line 45:     "3,989,619" should be —3,898,619—
Column 4, line 12:     "give" should be —given—
Column 6, line 32:     "stale" should be —stable—
    line 59:     "removing" should be —remaining—
Column 7, line 31:     after "antenna" insert —20—
    line 48:     "as" (second occurrence) should be —a—
Column 9, line 21:     "utput" should be —output—
Column 10, line 36:     "which," should be —which—
Column 15, line 31:     "precluded" should be —produced—

Signed and Sealed this

Twelfth Day of November 1985

[SEAL]

Attest:

DONALD J. QUIGG

Attesting Officer      Commissioner of Patents and Trademarks